United States Patent [19]

Chaikin

[11] 4,137,369

[45] Jan. 30, 1979

[54] VISUAL DYE INDICATOR OF SOLDER WICKING ACTION IN METAL COATED COPPER BRAID

[75] Inventor: Saul W. Chaikin, Sunnyvale, Calif.

[73] Assignee: Wik-It Electronics Corporation, Sunnyvale, Calif.

[21] Appl. No.: 793,330

[22] Filed: May 3, 1977

[51] Int. Cl.$^2$ .............................................. B23P 19/00
[52] U.S. Cl. ...................................... 428/624; 228/19; 228/35; 228/264; 428/647; 148/23
[58] Field of Search ............... 428/621, 624, 626, 639, 428/647, 674, 933, 608, 596; 148/23, 25; 228/19, 35, 264; 29/426

[56] References Cited

U.S. PATENT DOCUMENTS

| | | | |
|---|---|---|---|
| 3,627,191 | 12/1971 | Hood, Jr. ................................ | 29/426 |
| 3,715,797 | 2/1973 | Jackson et al. ........................ | 228/19 |
| 3,726,464 | 4/1973 | Howell et al. ......................... | 228/19 |
| 3,730,782 | 5/1973 | Poliak .................................... | 148/23 |

FOREIGN PATENT DOCUMENTS 689462  3/1953  United Kingdom ...................... 148/23

OTHER PUBLICATIONS

Grant, J. *Hackh's Chemical Dictionary* 4th Ed. McGraw Hill Co., N.Y. p. 586 (1972).

*Primary Examiner*—L. DeWayne Rutledge
*Assistant Examiner*—Michael L. Lewis
*Attorney, Agent, or Firm*—Townsend and Townsend

[57] ABSTRACT

A desoldering wick formed of tin-coated copper strands braided together. The wick is coated with a flux solution which includes a coloring agent such as a dye. In use, the extent to which molten solder has traveled along the wick is visually indicated by a color demarcation line between the portion of the wick still having colored flux thereon and the portion of the wick from which the colored flux has been discharged. The latter portion can then be cut off and discarded.

8 Claims, No Drawings

VISUAL DYE INDICATOR OF SOLDER WICKING ACTION IN METAL COATED COPPER BRAID

BACKGROUND OF THE INVENTION

1. Field of the Invention

The present invention relates to braided metallic desoldering wicks for removing solder from a soldered electrical connection. The invention is more particularly directed to a desoldering wick having a flux coating containing a dye for visually demarking the boundary between used and unused portions of the wick.

2. Description of the Prior Art

For several years braided metallic desoldering wicks have been used to remove solder from soldered electrical connections. For example, in order to remove an electrical component from a printed circuit board for replacement it is necessary to melt the solder which electrically and mechanically connects the component to the circuit board and to remove the molten solder. This is done by applying heat to the connection as with a soldering iron or gun and contacting the molten solder globule with the tip of the braided desoldering wick. The molten solder then flows up the wick and away from the connection through capillary action. In order to remove metallic oxides and other contaminants from the connection to be desoldered the braid is typically coated with a flux agent such as for example rosin flux.

An effective flux-coated solder-wicking braid should have the following properties:

1. Upon pressing the braid with a hot soldering iron onto the solder to be wicked the solder should quickly fuse, wet the metal of the braid and flow into it.
2. When the braid bearing the solder is removed from the work there should be no fillets of solder left on the work.
3. Some of the flux used on the braid will flow onto the work leaving a residue. This residue should be only a light tan color and not dark tan or brown.
4. The residue on the work should be electrically non-conducting and non-corrosive.
5. To effectively use fresh portions of braid for subsequent solder removal there should be a clear indication of the boundary between braid containing old solder and unused braid.

A form of solder-wicking braid which has been used employs braided copper wire coated with rosin flux. If the copper is clean then the braid functions well according to the above criteria. If the copper is contaminated with oxide either through inadequate cleaning of the braid before flux coating or through aging of the flux coated braid, then in operation the molten solder wets the copper sluggishly since the contamination must first be removed chemically by action of the flux. Further, the flux with its burden of copper now leaves a brown residue on the work because of the chemical compound formed between the copper contamination and the rosin flux.

The problem associated with the use of copper wicks have been avoided by applying a tin coating to the copper strands of the braid, the tin being applied by immersing the copper wires, before braiding, in molten tin. Such a tin coated copper braid is disclosed in U.S. Pat. No. 3,715,797 issued to Jackson et al.

Tin resists formation of contamination upon aging better than copper and is more readily wet by molten solder since tin is a component of solder. Furthermore the reaction of tin oxide contaminants with rosin does not give products which color the rosin flux residue. However, since tin and solder are both silvery colored metals the boundary between used and unused braid is not as clear as it is with copper braid. The Jackson patent referred to above suggests that the demarcation problem in tin coated braid may be solved by the expedient of dying or otherwise coloring the tin coating such that the solder captured will cover up the dye thereby showing by contrast the used portions of the braid material. In practice however application of this approach is difficult because of the fact that all methods of coloring metals involve formation of a surface film which inhibits wetting by molten solder. For example, aluminum surfaces may be colored by anodizing to form a porous oxide surface which is then dye-receptive. However, the surface is thereby made highly resistant to wetting by molten metals. The surface of tin has a thin coating of tin oxide resulting from exposure to the atmosphere. This coating if not too thick is not a significant barrier to wetting by molten solder. The coating will either be removed by chemical reaction with the rosin flux or will break up when the tin is melted during the soldering. It is essential to remove or undermine the tin oxide coating to achieve good wetting by molten solder. No colored substance has been found except a colored metal such as gold or copper which can be used to color a tin surface and be covered up by wicked solder.

SUMMARY OF THE INVENTION

It has been found that the incorporation of dye in the flux coating applied to the wick provides a clear indication of the boundary of used and unused braid. During the heat of soldering dye color is discharged so that the used braid becomes solder colored (silvery) and the unused braid remains colored by the dye. The incorporation of the small amount of dye required to color the flux coating does not make the flux residue conductive or corrosive. In contrast to coloring the tin coating, the addition of dye to the flux makes no essential change in the tin-flux-solder chemical, physical or metallurgical interactions and does not function by a "covering up" mechanism since the dye is a minor component in the rosin flux layer and is not located at the surface of the tin. The objective of presenting the molten solder with tinned copper braid is to promote wetability. This is preserved according to the present invention and lost in the suggestion of the referenced patent.

DETAILED DESCRIPTION OF THE PREFERRED EMBODIMENT

Dyes from a number of manufacturers and representing various chemical classes have been shown to perform well. There is no accepted standard method of assessing performance and so a rating system was developed in which two factors were evaluated: the ability to wick solder, and the darkness of the residue left on the work. A scale of 1 to 5 was used in which the highest number for each factor represented the best wicking ability and the least residue.

Performance was tested on printed circuit boards which had through-holes, with component leads soldered into the holes. Removal of the solder with the braid under test was carried out by an experienced operator. The rating scale for wicking performance is as follows:

5. BEST — ALL solder wets the braid and is removed from the board very fast. All through-holes are cleaned of solder.
4. ABOVE AVERAGE — Solder wets and is removed reasonably fast and some holes are not cleaned completely.
3. AVERAGE — Solder wets and is removed slowly and most holes are not cleaned.
2. BELOW AVERAGE — Solder barely removed; holes not cleaned.
1. POOR — Solder not removed from board or holes even when molten.

The rating scale for the residue visble on the board in the area of application is:
5. BEST — Hardly any stain or very faint tan stain.
4. ABOVE AVERAGE — Tan stain.
3. AVERAGE — Light brown or light colored stain.
2. BELOW AVERAGE — Brown or medium colored stain.
1. POOR — Dark brown or dark colored stain.

Braided wire received from the manufacturer is usually contaminated with oil from the braiding operation and miscellaneous dirt. Cleaning before flux coating was helpful in establishing the best performance and in promoting uniform coating of the braid by the flux solution. Any cleaning procedure directed at removal of the contaminants specified was effective. Tide, a commercial laundry detergent preparation, was used as a 0.5% solution in water, both with and without ultrasonic agitation of the tide solution. Immersion in various organic solvents such as methylene dichloride, trichloroethylene, toluene, and others were also found effective with and without ultrasonic agitation.

Following the cleaning step, the braid was immersed in an organic solvent solution of rosin flux containing a dye. The wire was then removed from the flux solution, allowed to drain, then air dried or heat dried to remove solvent. When dry the coated wire was easily handleable without excessive tack and was brightly colored.

FLUX

As a practical matter the flux employed was limited to that derived from rosin and furnished commercially as a water-white grade of rosin which is substantially uncolored, dissolved in a compatible solvent mixture. A number of companies offer rosin flux solutions differing mainly in the presence and identity of activator to promote fluxing action. In this work proprietary flux compositions were purchased from the Kester Solder Company in Chicago, and were designated Kester Rosin Flux No. 197 and Kester Rosin Flux No. 135 (activated and non-activated, respectively).

DYES

Dyes from the duPont Corporation, Allied Chemical Company, and BASF Wyandotte Corporation were tested. They represented the full range of colors available and were of various chemical classes. It was important that the dye have adequate solubility in the flux solvent system being used so that a sufficiently intense, uniform coloration of the braid resulted.

PREPARATION AND EVALUATION OF SOLDER WICKING BRAIDS

Tinned copper braid was cleaned before coating by immersion for 30 seconds in an ultrasonically agitated 0.5% solution of the commerical detergent Tide, followed by a one minute rinse in water and a 30 second rinse in methanol, both ultrasonically agitated. The cleaned braid was then dipped in a flux solution consisting of:

25.0 grams Kester Flux No. 197 Solution
23.2 grams methanol
0.84 grams dye or dye mixture
0.02 grams Tergitol NP The dye or dye mixture was usually first dissolved in the methanol and surfactant and then the dye solution mixed with the flux solution. The following table lists dyes tested and their performance and residue ratings.

Table I

|  | Solder Wicking Performance Rating | Residue Rating |
| --- | --- | --- |
| *Allied Chemical "Iosol Yellow" duPont "Fast Red B" ¼ part "Fast Orange GS" ¾ part | 5 | 2 |
| duPont "Fast Blue ARN" | 5 | 1 |
| duPont "Fast Blue MBSN" | 5 | 4 |
| BASF "Crystal Violet FN" | 5 | 4 |
| BASF "Neozapon Fiery Red BL" | 5 | 1 |
|  | 5 | 1 |

As can be seen from Table I the solder wicking performance with the various dyes is uniformly good. However, the flux residue left on the work vaires greatly, ranging from "4-above average" to "1-poor".

All dyes functioned satisfactorily in accordance with the present invention, that is, they permitted a distinction between used and unused portions of the braid. For applications where the color of the residue was not a problem or where it is known that the residue was to be removed, even the low residue rating dyed braids would be satisfactory. In instances where it is desired to have an indicator of residual flux, than a "low" residue-rated dye would be a definite advantage.

DYE THERMAL STABILITY TEST

To determine whether color loss or color change is due to a thermal effect, such as decolorization upon heating, or whether to some other effect, 2.3% solutions of several dyes were prepared in Kester Rosin Flux No. 135. One drop of each dye-flux solution was placed on a glass microscope slide and allowed to air dry. To simulate the heat of soldering the slides were placed in an oven at 500° F. for 2 minutes. The color was then compared to similarly prepared slides unheated. The results are given in Table II.

Table II

| Effect of heat on dyes in rosin flux | | |
| --- | --- | --- |
| Dye | Color Without Heating | Color After Heating |
| None (Kester Flux No. 135 only) | Clear | Very light yellow |
| duPont "Fast Red B" | Purple | Reddish brown |
| duPont "Fast Orange GS" | Yellow-Orange | Yellow-Orange |
| duPont "Fast Blue ARN" | Dark blue | Very light green |
| duPont "Fast Blue MBSN" | Turquoise | Light green |
| Allied "Iosol Red" | Red | Dark red |

All of the dyes in Table II are effective in marking the boundary between used and unused braid and yet some darken on heating, some lighten, some change color, and some remain unchanged.

What is claimed is:
1. A metal desoldering wick comprising:
(a) stranded copper wires forming a wick;

(b) a coating of tin surrounding said copper wires and;

(c) a coating surrounding said tin coating and including a soldering flux which imparts substantially no coloration to the wick and an indicator agent which exhibits a visually observable change in appearance upon exposure to the heat of the soldering operation to clearly demark the portion of the wick into which molten solder has been absorbed.

2. The desoldering wick of claim 1 wherein said coloring agent is a dye.

3. The desoldering wick of claim 2 wherein said dye is thermally unstable at the temperature of molten solder.

4. The desoldering wick of claim 1 wherein said flux is rosin flux.

5. The desoldering wick of claim 1 wherein said flux coating further includes a non-ionic surfactant agent.

6. In a desoldering wick composed of a plurality of copper wire strands and having a coating of tin surrounding said strands, the improvement comprising a coating surrounding said tin coating including a soldering flux which imparts substantially no coloration to the wick and an indicator agent which exhibits a visually observable change in appearance upon exposure to the heat of the soldering operation to clearly demark the portion of the wick into which molten solder has been absorbed.

7. The desoldering wick of claim 6 wherein said copper wire strands are braided together to form said wick.

8. The desoldering wick of claim 6 wherein said change in appearance comprises a change in color.

* * * * *